May 7, 1963  A. STIHL ET AL  3,088,504
PORTABLE BARK PEELING DEVICE
Filed Jan. 28, 1959  2 Sheets-Sheet 1
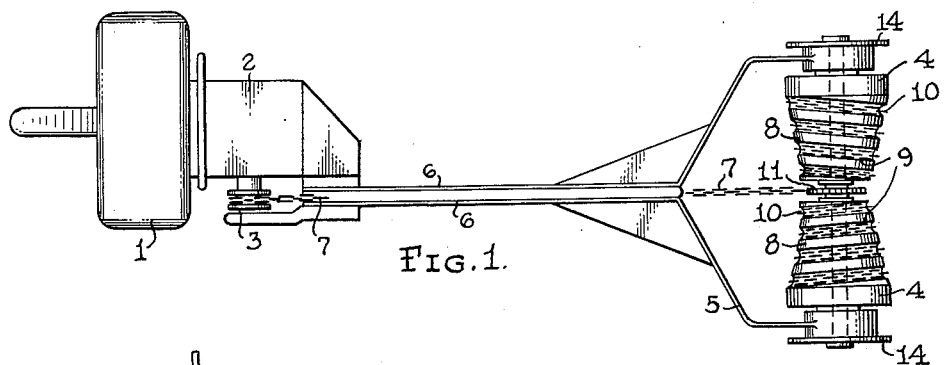
FIG. 1.
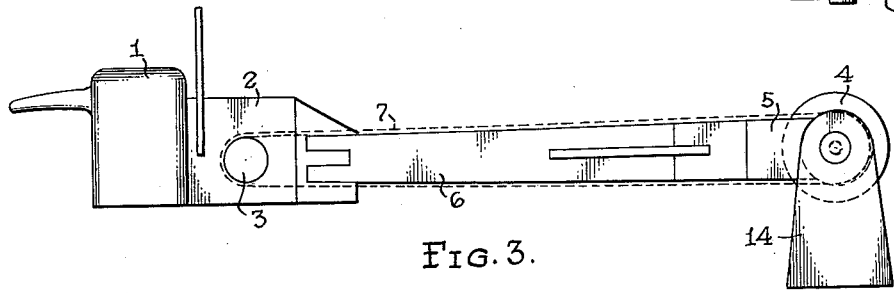
FIG. 3.
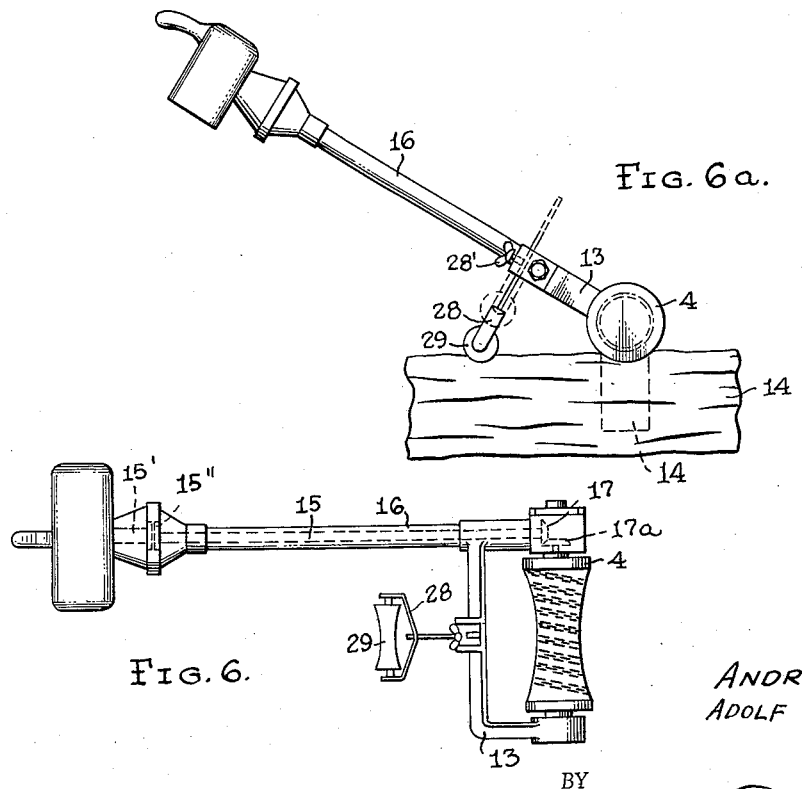
FIG. 6a.
FIG. 6.
INVENTORS
ANDREAS STIHL
ADOLF CASPARI
BY May 7, 1963 A. STIHL ET AL 3,088,504
PORTABLE BARK PEELING DEVICE
Filed Jan. 28, 1959 2 Sheets-Sheet 2

INVENTORS
ANDREAS STIHL
ADOLF CASPARI
BY

United States Patent Office 3,088,504
Patented May 7, 1963

3,088,504
PORTABLE BARK PEELING DEVICE
Andreas Stihl, Neustadt, Rems, Kreis Waiblingen, and Adolf Caspari, Hirschhausen, Oberlahn, Germany, assignors to Firma Andreas Stihl, Neustadt, Rems, Kreis Waiblingen, Germany
Filed Jan. 28, 1959, Ser. No. 789,591
Claims priority, application Germany Sept. 4, 1958
4 Claims. (Cl. 144—208)

The present invention relates to a portable motor chain saw. Heretofore known motor chain saws of the portable type have a drive motor to which a transmission and a clutch may be connected. Motor chain saws are also known which have no transmission and in which the chain driving sprocket for the saw chain is directly connected to the motor shaft without the intervention of a transmission.

The heretofore known chain saws as employed by the woodsman are exclusively employed for cutting down trees. Special devices as, for instance a specially shaped peeling knife or the like driven by means of a capstan or spindle through a rope were required for peeling the bark off logs. These special devices are, however, rather unwieldy and expensive particularly inasmuch as they have to be built as separate bark peeling machines.

It is, therefore, an object of the present invention to provide a multi-purpose tool which will overcome the above-mentioned drawbacks.

It is another object of this invention to provide a portable motor chain saw which in addition to cutting down trees may also be employed for peeling off the bark of logs.

It is a further object of this invention to provide a motor chain saw of the type set forth in the preceding paragraph, which will make it possible in a simple and safe manner to remove the bark from standing tree stems from the bottom to approximately a height of two yards to thereby save manually removing the bark from such standing trees, as it has heretofore been carried out with an axis.

These and other objects and advantages of the invention will appear more clearly from the following specification in connection with the accompanying drawings, in which:

FIGURE 1 is a top view of a motor chain saw according to the invention with a two-part directly driven peeling head with chain saw and concave working surface;

FIGURE 3 is a side view of the arrangement shown in FIGURES 1 and 2;

FIGURE 6 is a top view of an arrangement similar to that of FIGURE 1 but differing from FIGURE 1 in that the central drive of the peeling head by chain and sprocket has been replaced by a drive with a universal joint shaft.

FIGURE 6a is a view of a motor chain saw according to the invention in working position.

General Arrangement

Figure 4:
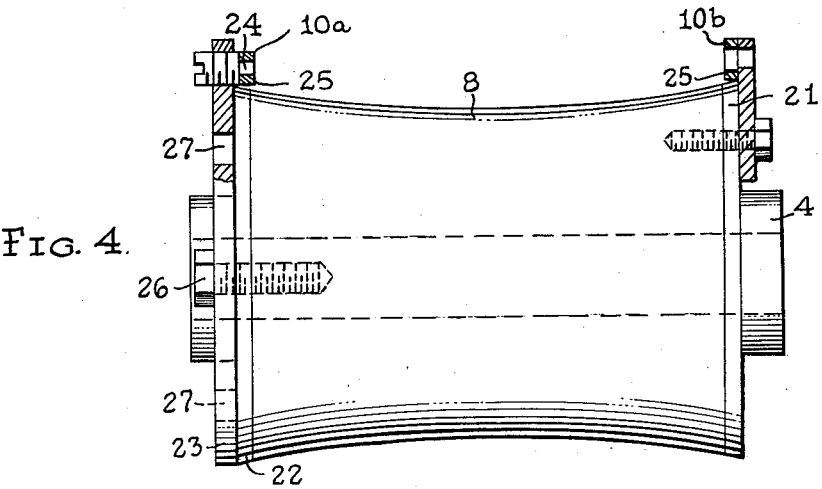
FIGURE 4 shows the peeling head more in detail and on a larger scale than FIGURES 1 to 3.

The arrangement according to the present invention comprises a one or two-part peeling head for peeling off the bark of trees, said peeling head being driven by a drive motor of an ordinary chain saw. In this way, it is possible mechanically to peel logs and fiber wood while at the same time all thin branches are being removed which heretofore required employment of an ax.

According to a further development of the principal feature of the present invention, the working surface of the peeling head is cylindrical, cone-shaped or concave. The peeling head comprises a shaft having wound therearound a one or two-part sawing chain, preferably a planing gear chain which serves as peeling tool. The saw chain is arranged in a groove provided in the surface of the roller. In this way, an ordinary portable motor chain saw may be employed which, in conformity with the present invention, has a peeling head connected thereto in relatively simple manner while the ordinary chain saw, after corresponding disassembly steps, can be employed as cutting tool for the peeling head. In this way, the field of application of the ordinary motor chain saw is considerably broadened thereby filling a gap which has existed heretofore. The ordinary motor chain saw will thus become a universal tool by means of which, in addition to the ordinary sawing operations, also the removal of bark from logs can be effected. Another advantage of the arrangement according to the invention consists in that the new bark peeling device can, similar to the heretofore known chain saws, be reground by the woodsman.

Structural Arrangement

Referring now to the drawings in detail and FIG. 1 thereof in particular, the arrangement shown therein comprises a motor 1 for a portable motor chain saw, said motor in a manner known per se being connected to a saw transmission 2 which latter is preceded by a clutch of any standard type. A sprocket wheel 3 protrudes from the saw transmission in a manner likewise known per se. The saw transmission 2 has detachably connected thereto the peeling device according to the present invention. The said peeling device as shown in FIG. 1 comprises a two-part peeling head 4 of hyperboloidal contour, said peeling head being rotatably journalled in a fork 5. The stem of fork 5 consists of two sheet metal members 6 which cover the sides of drive chain 7 connected to drive sprocket wheel 3.

The peeling head 4 consists primarily of a hyperboloidal two-part roller 8 which has a spiral-shaped groove 9 extending along its surface and in conformity with the present invention having arranged therein an ordinary saw chain 10, preferably a planing chain. In the central portion of the two-part peeling head 4 there is arranged a sprocket wheel 11 fixedly connected to said peeling head. Said sprocket wheel 11 meshes with the driving chain 7 whereby a power transfer from motor 1 to peeling head 4 will be assured.

Figure 2:
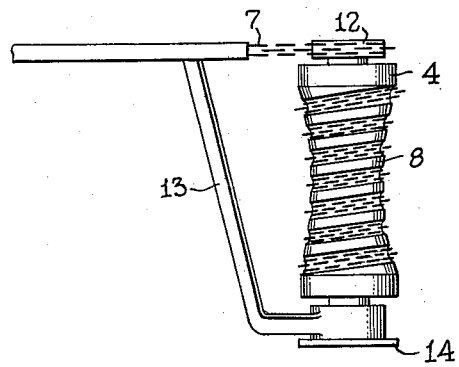
FIGURE 2 is a top view of a motor chain saw according to the invention with a unilateral support of a directly driven peeling head with chain saw and concave working surface.

The arrangement of FIG. 2 differs from that of FIG. 1 merely in that the drive of the peeling head 4 is effected not from the central portion but from the side of said peeling head. More specifically, this drive is effected through a sprocket wheel 12 meshing with the drive chain 7. This arrangement which is to be considered a slight modification of that of FIG. 1, has the advantage that the hyperboloidal roller 8 of the peeling head has a continuous surface or consists of a single part. As a result thereof, the peeling head 4 may be journalled unilaternally in a protruding bracket 13.

FIG. 3 shows a view of the arrangement according to FIGS. 1 and 2 and illustrates sliding shoes 14 which are connected to the bearings of the peeling head 4. The purpose of such sliding shoes consists in limiting the cutting depth during the operation of the devise according to the invention. These sliding shoes 14 are ear-shaped and diverge downwardly in such a way that, during operation of the device, they will tangentially rest against a portion of the cross-section of the tree log to be worked whereby at the same time also a guiding of the entire device will be assured. Advantageously, the sliding shoes 14 are adjustable.

Figure 5:
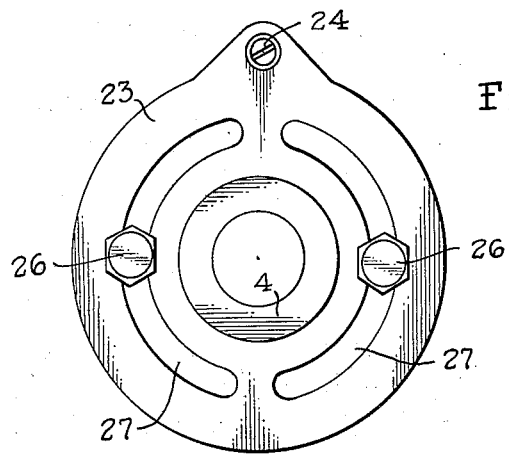
FIGURE 5 is a side view of the saw chain tightening structure shown partly in section and partly in view in FIGURE 4.

FIG. 4 shows on an enlarged scale a view of the hyperboloidal roller 8 of peeling head 4 and also shows an arrangement for tightening the sawing chain 10. The said tightening arrangement is connected on one hand to an end plate 21 of peeling head 4 and on the other hand to a plate 23 (see also FIG. 5) which latter is adjustably connected to the other end plate 22 in such a way that a tightening of chain 10 will be possible by rotation of plate 23 to a new position in which it is arrested. The connection of the chain ends 10a, 10b to the two plates 21, 23 is effected by bolts 24 which engage corresponding eyes 25 of the chain saw 10. The adjustment of plate 23 is effected by loosening and subsequent tightening of screws 26, the shanks of which extend through semi-circular slots 27 and are screwed into end plate 22.

FIGS. 6 and 6a show primarily the same arrangement as FIGS. 1 and 3 except for the sole difference that the central drive of the peeling head 4 is effected through a universal joint shaft 15 which latter is directly connected to motor 1. Advantageously, universial shaft 15 is surrounded by a tube 16 which at the same time forms the stem of the fork-shaped bracket 13 carrying the peeling head 4. The universal shaft 15 remote from the peeling head has a driving connection with motor shaft 15' by way of the clutch indicated at 15''. That end of universal shaft 15 which is remote from motor 1 has drivingly connected thereto a set of intermeshing bevel gears 17, 17a by means of which the driving force of motor 1 is conveyed to peeling head 4 through shaft 15. In order to allow the device to be moved in a simple manner along the log to be peeled, fork-shaped bracket 13 has connected thereto a fork 28 in which a supporting roller 29 is journalled so as to be rotatable about the longitudinal axis of roller 29 and also to be adjustable as to height. Thumb-screw 28' can be availed of for clamping fork 28 in position and, upon loosening of this screw, fork 28 can be adjusted thereby adjusting the supporting roller.

As will be evident from the preceding description, the bark peeling device according to the present invention will bring about a considerable saving in time aside from the fact that the peeling operation will not require the woodsman to employ such high force as it was heretofore necessary in connection with the operation of heretofore known peeling devices. Thus, in addition to a considerable saving in time, also an increase in the output and efficiency will be assured by the device according to the invention.

It is, of course, to be understood that the present invention is, by no means, limited to the particular constructions shown in the drawings, but also comprises any modifictions within the scope of the appended claims.

Thus, instead, of providing the apparatus according to the invention with one peeling head only, it is also possible to provide the apparatus with two or more peeling heads which are arranged adjacent each other in series with regard to each other or in an offset arrangement with regard to each other. The provision of a plurality of peeling heads on the appaartus makes it possible in a single operative step to remove the bark from a considerably larger area of the tree or log.

The individual peeling heads arranged adjacent or in an offset manner with regard to each other are journalled in a frame common thereto. All of the peeling heads on the same frame are driven by a drive motor common thereto from which a drive chain leads to each individual peeling head.

What we claim is:

1. In combination in a portable bark peeling device: a frame, a hyperboloidal peeling head rotatably mounted in said frame, a motor in said frame drivingly connected with said peeling head, a spiral groove in said peeling head commencing at one end thereof and extending to the other and winding around said head, a saw chain in said groove, and means connecting the opposite ends of said saw chain with said head at the opposite ends thereof, one of said means comprising a plate mounted on the end of said head, means for adjusting said plate on the head in the direction of the circumference thereof to adjust the tension on said saw chain, and means for clamping the plate in its adjusted position to the said head.

2. In combination in a portable peeling device: a frame, peeling head means rotatably mounted in the frame decreasing in diameter from the ends toward the center, a pair of spiral grooves in the opposite ends of said peeling head means spiralling in respectively opposite directions from the outer ends of the peeling head means toward the center thereof, and saw chains disposed in said spiral groove means and connected with the peeling head for rotation therewith, there being a motor in the frame drivingly connected with said peeling head means.

3. In combination in a portable bark peeling device: a frame, a peeling head mounted in said frame and decreasing in diameter from the ends thereof to the center, a motor in the frame drivingly connected with the peeling head, spiral groove means in the peeling head, saw chain means in said groove means, and means connecting the saw chain means to the peeling head means adjacent the ends of the peeling head means comprising plate members attached to the ends of said peeling head means, and bolts extending through the saw chain means and threaded into said plates.

4. In combination according to claim 3, in which one of said plates is adjustable on the pertaining end of the peeling head for adjusting the tension of the saw chain means.

References Cited in the file of this patent

UNITED STATES PATENTS

| 563,776 | Lee | July 14, 1896 |
|---|---|---|
| 664,535 | Dickinson | Dec. 25, 1900 |
| 1,461,376 | Bartlett | July 10, 1923 |
| 1,503,723 | Strom | Aug. 5, 1924 |
| 1,874,220 | Aurand | Aug. 30, 1932 |
| 2,432,459 | Timmerman | Dec. 9, 1947 |
| 2,570,700 | Marcerou | Oct. 9, 1951 |
| 2,645,255 | Francescatti et al. | July 14, 1953 |
| 2,650,812 | Joy | Sept. 1, 1953 |
| 2,675,835 | Kiekhaefer | Apr. 20, 1954 |
| 2,708,468 | Lantz | May 17, 1955 |
| 2,821,216 | West et al. | Jan. 28, 1956 |

FOREIGN PATENTS

| 932,037 | France | Nov. 17, 1947 |
|---|---|---|
| 87,829 | Norway | Aug. 6, 1956 |
| 28,183 | Germany | Aug. 2, 1884 |
| 124,643 | Great Britain | Apr. 3, 1919 |
| 122,026 | Sweden | June 22, 1948 |